United States Patent
Yeh et al.

(10) Patent No.: US 8,463,609 B2
(45) Date of Patent: Jun. 11, 2013

(54) VOICE INPUT SYSTEM AND VOICE INPUT METHOD

(75) Inventors: Keng-Hung Yeh, Taoyuan (TW); Liang-Sheng Huang, Taipei (TW); Chao-Jen Huang, Taipei (TW); Jia-Lin Shen, Taipei (TW)

(73) Assignee: Delta Electronics Inc., Taoyuan Hsien (TW)

( * ) Notice: Subject to any disclaimer, the term of this patent is extended or adjusted under 35 U.S.C. 154(b) by 1047 days.

(21) Appl. No.: 12/431,821

(22) Filed: Apr. 29, 2009

(65) Prior Publication Data

US 2009/0276219 A1 Nov. 5, 2009

(30) Foreign Application Priority Data

Apr. 30, 2008 (TW) .............................. 97115997 A

(51) Int. Cl.
*G10L 15/04* (2006.01)
*G10L 15/18* (2006.01)

(52) U.S. Cl.
USPC ........................... 704/251; 704/254; 704/257

(58) Field of Classification Search
None
See application file for complete search history.

(56) References Cited

U.S. PATENT DOCUMENTS

| | | | | | |
|---|---|---|---|---|---|
| 6,064,959 | A | * | 5/2000 | Young et al. | 704/251 |
| 6,073,097 | A | * | 6/2000 | Gould et al. | 704/251 |
| 6,304,844 | B1 | * | 10/2001 | Pan et al. | 704/257 |
| 7,010,490 | B2 | * | 3/2006 | Brocious et al. | 704/275 |
| 7,383,172 | B1 | * | 6/2008 | Jamieson | 704/9 |
| 7,526,431 | B2 | * | 4/2009 | Roth et al. | 704/270 |
| 7,603,276 | B2 | * | 10/2009 | Yoshizawa | 704/256.2 |
| 8,095,364 | B2 | * | 1/2012 | Longe et al. | 704/257 |
| 2005/0065789 | A1 | * | 3/2005 | Yacoub et al. | 704/231 |

FOREIGN PATENT DOCUMENTS

| CN | 1811696 A | 8/2006 |
|---|---|---|
| CN | 1811697 A | 8/2006 |

* cited by examiner

*Primary Examiner* — Brian Albertalli
(74) *Attorney, Agent, or Firm* — Volpe and Koenig, P.C.

(57) ABSTRACT

In the present invention, a voice input system and a voice input method are provided. The voice input method includes the steps of: (A) initiating a speech recognition process by a first input associated with a first parameter of a first speech recognition subject; (B) providing a voice and a searching space constructed by a speech recognition model associated with the first speech recognition subject; (C) obtaining a sub-searching space from the searching space based on the first parameter; (D) searching at least one candidate item associated with the voice from the sub-searching space; and (E) showing the at least one candidate item.

22 Claims, 3 Drawing Sheets

VOICE INPUT SYSTEM AND VOICE INPUT METHOD

FIELD OF THE INVENTION

The present invention relates generally to a voice input system and a voice input method, and more particularly to a voice input system and a voice input method for the handset device.

BACKGROUND OF THE INVENTION

Nowadays, using voice recognition for inputting words is one of the important functions on the handset device. Applications such as mobile search and dictation can be directly or indirectly accomplished with the foregoing function by inputting voice.

Please refer to FIG. 1, which shows the flow sheet of a conventional voice input method on the handset device. Accounting to FIG. 1, the user initiates a voice input method first (step 10), and then presses a voice recognition button (step 11), for example, a recording button. After that the user inputs a voice (step 12) for proceeding voice recognition (step 13), and searches the most appropriate recognition consequence from a voice recognition searching space constructed by the acoustic model, the lexical model and the language model in order to list candidate words (step 14) for the user's choosing by the up/down button (step 15). If the candidate words are actually needed, the user can choose the word to show (step 16). If the candidate words are not needed, the user inputs a voice again (step 12) for proceeding voice recognition (step 13). Nowadays, people usually use Viterbi Search as a searching method to proceed voice recognition.

Moreover, the voice input system on the handset device has problems such as technology bottleneck and noisy environment to cause its voice recognition worse than the indoor computer. Therefore, the voice input system often provides a plurality of candidate words for the user's sifting. If the candidate words are too many or the recognition consequences that the user expects are listed too many, the user will waste time and have unpleasant experience during sifting.

There are three kinds of the common voice recognition errors including insertion, deletion and substitution. If the voice input system lacks more restriction on the searching space or the methods for rising recognition rate to reduce the above-mentioned errors, the candidate words would have many wrong choices. Moreover, if there is no choice for the user among the candidate words, the voice input system will request the user to input voice again, which makes the user disturbed.

Accordingly, a voice input system and a voice input method to solve the above-mentioned problems is developed. The inventors purpose to rectify those drawbacks and provide the voice input system and the voice input method that reduce the searching space with smoothly operation, rise speech recognition rate and decrease the user's spending time.

SUMMARY OF THE INVENTION

In accordance with one aspect of the present invention, a voice input system and a voice input method are provided. The voice input system and the voice input method of the present invention can combine a voice recognition button and a sifting condition button to initiate speech recognition and provide a sifting recognition consequence corresponding to a parameter of a speech recognition model. The present invention not only reduces a searching space, but also makes the recognition consequence more precise for reducing insertion error, deletion error and substitution error.

In accordance with another aspect of the present invention, a voice input system and a voice input method are provided. After initiating a speech recognition process for obtaining the recognition consequence, the present invention can provide a resifting mechanism that may use different sifting condition to sift the recognition consequence to make the recognition consequence more precise, and also decreases inputting times.

In accordance with a further aspect of the present invention, a voice input system is provided. The voice input system includes an input module generating a first input; a voice module providing a voice; a speech recognition model constructing a searching space; a table having a plurality of inputs and a plurality of parameters corresponding to a first speech recognition subject associated with the speech recognition model; a processing module extracting from the table a first one of the plurality of parameters corresponding to the first input, obtaining a sub-searching space from the searching space based on the first parameter, and recognizing at least one candidate item corresponding to the voice from the sub-searching space through a speech recognition; and an output module showing the at least one candidate item.

Preferably, the processing module receives a second input so as to further sift the at least one candidate item.

Preferably, the second input is associated with a second one of the plurality of parameters.

Preferably, the table further has a plurality of parameters corresponding to a second speech recognition subject having a corresponding parameter associated with the second input.

Preferably, the speech recognition model includes a model selected from a group consisting of an acoustic model, a lexical model, a language model and a combination thereof.

Preferably, the first speech recognition subject relates to one selected from a group consisting of a specific number of words, a specific number of syllables and a phrase having a specific number of terms, and the plurality of parameters are a plurality of numeral codes.

Preferably, the first speech recognition subject relates to an input method being one selected from a group consisting of a phonetic notation input method, a phonetic transcription input method, a radical input method, a stroke input method and a tone input method, and the plurality of parameters are a plurality of corresponding codes of the input method.

Preferably, the first speech recognition subject relates to one of a male voice and a female voice.

Preferably, the first speech recognition subject relates to one of one of a rough acoustic model and an accurate acoustic model, and one of an anti-noise acoustic model and a non-anti-noise acoustic model.

Preferably, the first speech recognition subject relates to a specific sentence pattern under a specific domain.

Preferably, the processing module further initiates a speech recognition function to perform the speech recognition according to the first input.

Preferably, the input module is one selected from a group consisting of a key, a keyboard, a virtual keyboard and a touch panel.

Preferably, the voice module is one selected from a group consisting of a voice input device, a voice storage device and a combination thereof.

Preferably, the at least one candidate item is at least one selected from a group consisting of a word, a phrase, a sentence and a combination thereof.

In accordance with further another aspect of the present invention, a voice input method is provided. The voice input method includes steps of (A) initiating a speech recognition process by a first input associated with a first parameter of a first speech recognition subject; (B) providing a voice and a searching space constructed by a speech recognition model associated with the first speech recognition subject; (C) obtaining a sub-searching space from the searching space based on the first parameter; (D) searching at least one candidate item associated with the voice from the sub-searching space; and (E) showing the at least one candidate item.

Preferably, the voice input method further includes steps of (F) sifting the at least one candidate item by a second input.

Preferably, the second input is associated with a corresponding parameter of the first speech recognition subject.

Preferably, the second input is associated with a second parameter of a second speech recognition subject.

In accordance with further another aspect of the present invention, a voice input method for a handset device is provided. The voice input method for a handset device includes steps of (A) providing a searching space based on a speech recognition model; (B) receiving a first input parameter associated with the speech recognition model and obtaining a sub-searching space from the searching space based on the first input parameter; (C) receiving a voice and recognizing at least one candidate item associated with the voice from the sub-searching space through a speech recognition; and (D) showing the at least one candidate item.

Preferably, the speech recognition model includes a plurality of speech recognition subjects, and the first input parameter is corresponding to a first one of the speech recognition subjects.

Preferably, the voice input method further includes a step of (E) receiving a second input parameter so as to further sift the at least one candidate item accordingly.

In accordance with further another aspect of the present invention, a voice input method is provided. The voice input method, having a searching space constructed by a speech recognition model, includes steps of: (A) receiving an input parameter associated with the speech recognition model and obtaining a sub-searching space from the searching space accordingly; (B) receiving a voice and recognizing at least one candidate item associated with the voice from the sub-searching space by a speech recognition; and (C) showing the at least one candidate item.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
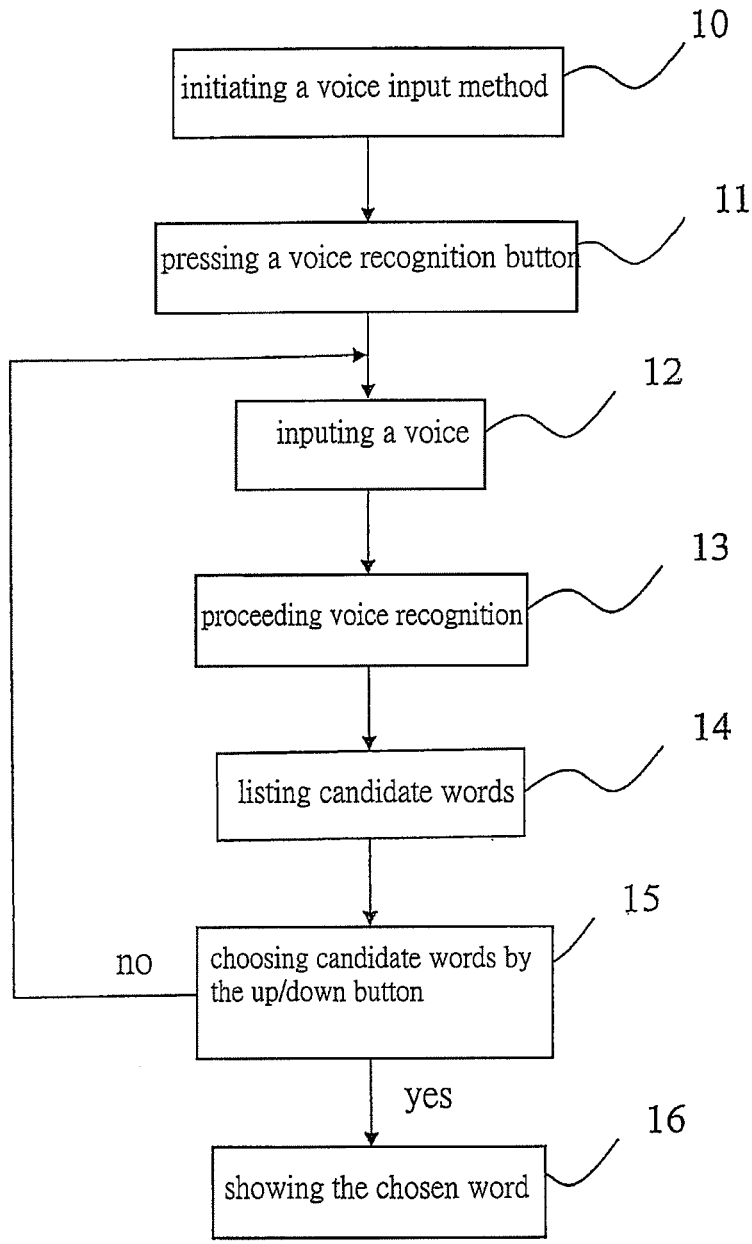
FIG. 1 shows a flow sheet of a conventional voice input method on the handset device.
Figure 2:
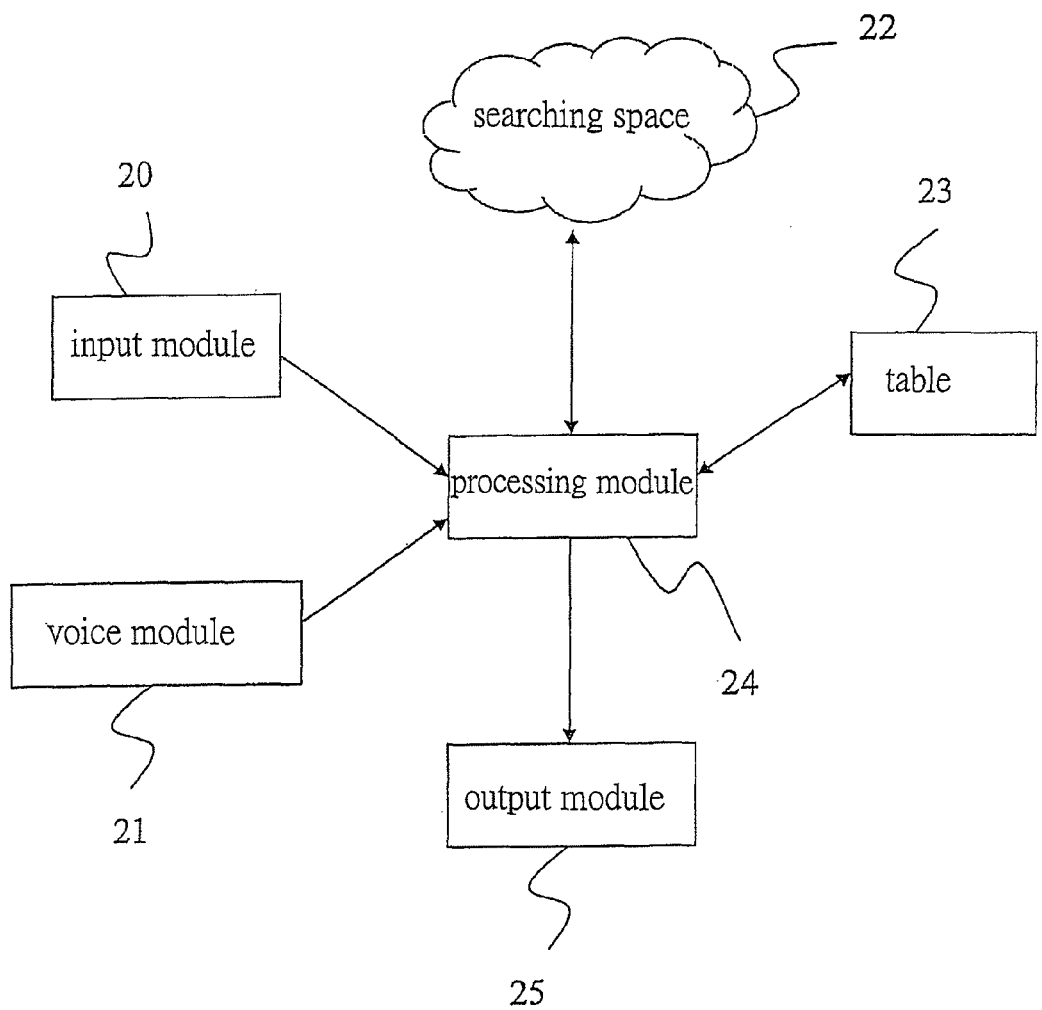
FIG. 2 shows a block diagram of the voice input system according to a preferred embodiment of the present invention.

Please refer to FIG. 2, which shows a block diagram of the voice input system according to a preferred embodiment of the present invention. The voice input system includes an input module 20, a voice module 21, a searching space 22, a table 23, a processing module 24 and an output module 25.

The input module 20 has a plurality of input buttons. Each button has a input value. The voice module 21 provides a voice to the processing module 24. The searching space 22 is constructed by a speech recognition model. The table 23 has a plurality of inputs and a plurality of parameters corresponding to a speech recognition subject associated with the speech recognition model. The processing module 24 is connected to the input module 20, the voice module 21, the searching space 22 and the table 23. The user may send a first input by one of the input buttons to the processing module 24. The processing module 24 extracts from the table 23 a first one of the plurality of parameters corresponding to the first input, and obtains a sub-searching space from the searching space 22 based on the first parameter, and recognizes at least one candidate item corresponding to the voice from the sub-searching space through a speech recognition. The output module 25 showing the at least one candidate item is for the user's choosing.

The processing module 24 may receives a second input so as to further sift the at least one candidate item. The second input may be associated with a second one of the plurality of parameters corresponding to the speech recognition subject. The first input may be the same as or different from the second input. The table 23 may have the plurality of parameters corresponding to another speech recognition subject differed from the speech recognition subject so the second input may be a corresponding parameter associated with another speech recognition subject.

The input module 20 may be a keyboard, a virtual keyboard or a touch panel. The voice module 21 may be a voice input device or a voice storage device based on the different sources of the speeches. The processing module 24 may obtain a speech which will be recognized from the speech recognition model during the speech recognition process. Moreover, the processing module 24 may initiate a speech recognition function to perform the speech recognition according to the first input.

The speech recognition model includes a model selected from a group consisting of an acoustic model, a lexical model, a language model and a combination thereof. The candidate item includes a word, a phrase and a sentence. The speech recognition subject corresponding to the speech recognition model is selected from 1) one selected from a specific number of words, a specific number of syllables and a phrase having a specific number of terms; 2) an input method; 3) a male voice or a female voice; 4) a rough acoustic model, an accurate acoustic model, an anti-noise acoustic model or a non-anti-noise acoustic model; 5) a specific sentence pattern under a specific domain. Therefore, the searching space may be reduced to a related sub-searching space based on selecting a specific parameter of the speech recognition subject.

If the speech recognition subject relates to one selected from a specific number of words, a specific number of syllables and a phrase having a specific number of terms, the plurality of parameters corresponding to the speech recognition subject may be a plurality of numeric codes. If the speech recognition subject relates to an input method, the plurality of parameters corresponding to the speech recognition subject may be a plurality of corresponding codes of the input method. The input method is selected from a phonetic notation input method, a phonetic transcription input method, a radical input method, a stroke input method, a tone input method and other methods which are not listed above.

Some embodiments of the speech recognition subject are listed below.

1. If the speech recognition subject relates to one selected from a specific number of words, a specific number of syllables and a phrase having a specific number of terms, the plurality of parameters may be the numbers 1 to 9 buttons to represent that the item which will be inputted may be 1 to 9 words, the specific number of syllables and the phrase having a specific number of terms, such as: (1) pressing the number button "2" means the number of the items (word) are two, such as "今天" or "Language Model". The items are restricted by the lexical model. (2) pressing the number button "3" means the phrase having three items (terms), such as "今天 天氣 很好", "台達電子 得到 第一名" or "I love you". The items are restricted by the lexical model/the language model.

2. The speech recognition subject relates to the input method. (1) If the user take a phonetic notation input method, the plurality of parameters may be syllable onset notation and syllable rime notation, such Chinese phonetic notation "ㄅ" to "ㄩ". Therefore, pressing the Chinese phonetic notation "ㄐ" mean the syllable onset is "ㄐ". For example, "ㄐㄧㄣ" can spell "今". The items are restricted by the acoustic model/the lexical model. (2) If the speech recognition subject relates to a phonetic transcription input method, the plurality of parameters may be the phonetic transcription like English letters A to Z. The user presses "J" means the first phonetic transcription letter of the item. For example, "jin" can spell "今" The items are restricted by the acoustic model/the lexical model.

3. If the speech recognition subject relates to a male voice or a female voice, pressing the number button "2" may mean to take the female voice as the speech recognition subject. The items are recognized more precisely for the female user and are restricted by the acoustic model.

4. The speech recognition subject relates to a rough acoustic model, an accurate acoustic model, an anti-noise acoustic model or a non-anti-noise acoustic model. (1) If the speech recognition subject relates to a rough acoustic model or an accurate acoustic model, pressing the number button "2" may mean to take a rough acoustic model as the speech recognition subject. The items are recognized quickly by reducing recognition rate and are restricted by the acoustic model. (2) If the speech recognition subject relates to an anti-noise acoustic model or a non-anti-noise acoustic model, pressing the number button "2" may mean to take the anti-noise acoustic model as the speech recognition subject. The better recognition rate can be obtained in the noisy situation. The items are restricted by the acoustic model.

5. If the speech recognition subject relates to a specific sentence pattern under a specific domain, a common sentence for a specific situation would be provided. (1) For example, pressing the number button "x" may mean "I reach somewhere to find something". (2) For example, pressing the number button "y" may mean "I dial someone". The items are restricted by the acoustic model, the lexical model, the language model or the combination thereof.

According to the above-mentioned illustration, the table 23 has a plurality of different speech recognition subjects corresponding to parameters respectively. The user may obtains the sub-searching space corresponding to the searching space constructed by the speech recognition model based on a first sifting condition which is the specific parameter of the speech recognition subjects. A sifting recognition consequence associated with the voice from the sub-searching space is recognized through the general speech recognition process thereafter.

After recognizing the candidate items, the user may use a second sifting condition which is the specific parameter of the same speech recognition subjects or of the different speech recognition subjects. The candidate items are sifted to obtain more precise sifting recognition recognition consequence through the second sifting condition. The first sifting condition and the second sifting condition may be the same on the actual operation. For example, the Chinese items could have the same syllable rime or onset. The English items could also have the same prefix.

Figure 3:
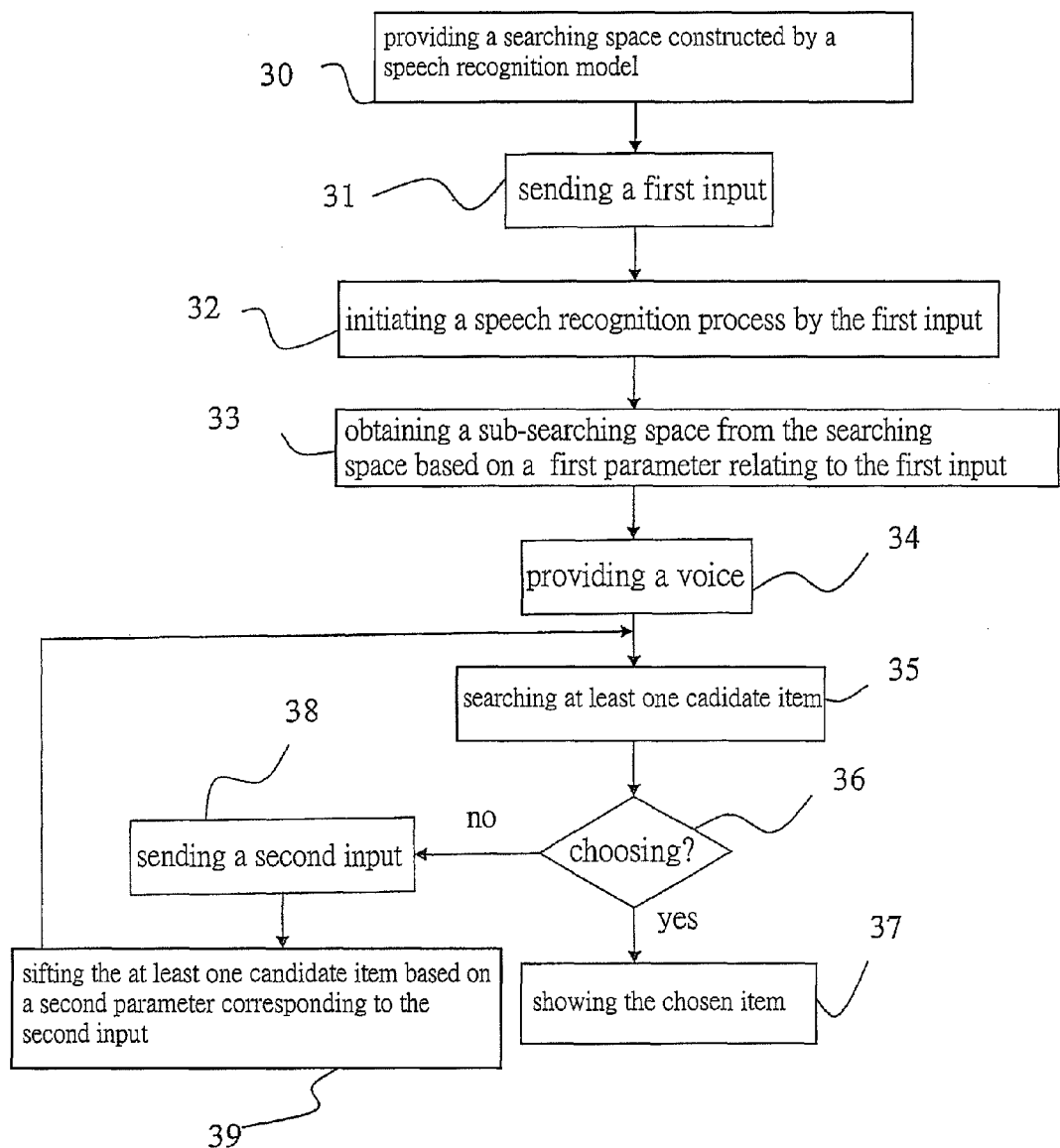
FIG. 3 shows a flow sheet of the voice input method according to a preferred embodiment of the present invention.

According to the foregoing, a third or a fourth sifting condition may be provided by the user for the voice input system of the present invention. The last sifting recognition consequence is sifted for user to obtain the candidate items. Please refer to FIG. 3, which shows a flow sheet of the voice input method according to a preferred embodiment of the present invention.

The voice input method includes several steps below. The voice input system provides a searching space constructed by a speech recognition model (step 30). The user sends a first input by the plurality of input buttons (step 31) and initiates a speech recognition process by the first input (step 32). Because the first input corresponds to a first parameter of a speech recognition subject and the speech recognition subject relates to the speech recognition model, the voice input system obtains a sub-searching space from the searching space based on the first parameter corresponding to the first input (step 33). A voice pre-stored in the first input system or inputted immediately by the user is provided (step 34). According to the speech recognition process, the voice input system searches at least one candidate item associated with the voice from the sub-searching space (step 35). The user chooses an item from the at least one candidate item (step 36). The voice input system shows the item chosen by the user (step 37). If the at least one candidate item is too many or is not needed by the user, the user may send a second input (step 38). The voice input system further sifts the at least one candidate item based on a second parameter corresponding to the second input (step 39). Thereafter, the sifting recognition consequence of the last candidate items is sifted for the user to choose again.

If the user is not satisfied with the sifting recognition consequence, step 38 to step 39 may be repeated to sift the candidate items according to the different sifting conditions. The different sifting conditions provides different inputs associated with the different parameters or the same parameters of the same speech recognition subject or respectively associated with the corresponding parameters of the different speech recognition subjects.

To input the Chinese two-word term "今天" by prior arts for example, if the user inputs it and presses the voice recognition button, the recognition consequence could be listed in Chinese terms such as "晴天", "星期天", "前天" and "今天" in turn. The recognition consequence includes the wrong non-two-word term "星期天", so the user need to press the up/down button three times for choosing "今天" If the user presses number button "2" for recognition by the present invention, the recognition consequence would be listed as "晴天", "前天" and "今天" in turn. Because of restricting the number of words, the wrong recognition consequence including non-two-word term will not be listed, and the user needs to press the up/down button for only two times. Furthermore, the user may use the phonetic notation input method or the phonetic transcription input method to restrict the syllable onset for sifting, such as using the phonetic notation "ㄐ" of "ㄐㄧㄣ" or the phonetic transcription "j" of "jin" (both "ㄐㄧㄣ" and "jin" can spell Chinese term "今").

Moreover, the user may input in English by the present invention. For example, to input the phrase "free download manager", the user may press the number button "3" for recognition (restricting the number of terms), and the candidate items will be recognised for the user to choose. If the user needs to sift further, the user may input the first letter of the respective terms (f, d, m).

When the user presses the number button for recognition, the number of recording items is provided. Such a method can restrict the number of the input, so the searching space may be reduced to the sub-searching space with specific length items. Therefore, insertion error and deletion error of prior arts are reduced to raise the recognition rate efficiently.

According to the above-mentioned method for obtaining the initial sifting recognition consequence, the user may input the syllable onset by a resifting mechanism for sifting more precisely. By using the inputting method of the resifting mechanism, the syllable onset may be inputted by the user, or the possible syllable onset of the candidate items in the initial sifting recognition consequence may be detected by the voice input system. The inputting method of the resifting mechanism can provide a smaller range of the syllable onset both precisely and efficiently, moreover, substitution error of prior arts may be reduced efficiently.

The present invention may make parameters of each speech recognition subject as the sifting conditions. The inputting buttons on the present handset device are not only number buttons for inputting numbers, but also suitable for other input methods relating to input parameters. For example, the number button "2" may have Chinese phonetic notations such as "ㄍ", "ㄐ", "ㄎ", "ㄧ", or English phonetic transcription such as "A", "B", "C". The searching space may be reduced to the sub-searching space with specific items by restricting pronunciations or spelling of the inputs.

In conclusion, the present invention can provide "initiating speech recognition to combine sifting condition and resifting mechanism" which may use speech recognition subjects of the acoustic model, the lexical model or the language model. The present invention not only makes the recognition consequence more precise, but also decreases inputting times. Moreover, there is no additional hardware and software to be needed, so the cost is extremely low. Therefore, the voice input system and the voice input method of the present invention are easy to use for the user, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A voice input system, comprising:
   an input module generating a first input;
   a voice module providing a voice;
   a speech recognition model constructing a searching space;
   a table having a plurality of inputs and a plurality of parameters corresponding to a first speech recognition subject associated with the speech recognition model, wherein the first speech recognition subject relates to one selected from a group consisting of a specific number of words, a specific number of syllables, a phrase having a specific number of terms and a combination thereof;
   a processing module extracting from the table a first one of the plurality of parameters corresponding to the first input, obtaining a sub-searching space from the searching space based on the first parameter, and recognizing at least one candidate item corresponding to the voice from the sub-searching space through a speech recognition; and
   an output module showing the at least one candidate item.

2. The voice input system according to claim 1, wherein the processing module receives a second input so as to further sift the at least one candidate item.

3. The voice input system according to claim 2, wherein the second input is associated with a second one of the plurality of parameters.

4. The voice input system according to claim 2, wherein the table further has a plurality of parameters corresponding to a second speech recognition subject having a corresponding parameter associated with the second input.

5. The voice input system according to claim 1, wherein the speech recognition model includes a model selected from a group consisting of an acoustic model, a lexical model, a language model and a combination thereof.

6. The voice input system according to claim 1, wherein the plurality of parameters are a plurality of numeral codes.

7. The voice input system according to claim 1, wherein the first speech recognition subject further relates to an input method being one selected from a group consisting of a phonetic notation input method, a phonetic transcription input method, a radical input method, a stroke input method and a tone input method, and the plurality of parameters are a plurality of corresponding codes of the input method.

8. The voice input system according to claim 1, wherein the first speech recognition subject further relates to one of a male voice and a female voice.

9. The voice input system according to claim 1, wherein the first speech recognition subject further relates to one of one of a rough acoustic model and an accurate acoustic model, and one of an anti-noise acoustic model and a non-anti-noise acoustic model.

10. The voice input system according to claim 1, wherein the first speech recognition subject further relates to a specific sentence pattern under a specific domain.

11. The voice input system according to claim 1, wherein the processing module further initiates a speech recognition function to perform the speech recognition according to the first input.

12. The voice input system according to claim 1, wherein the input module is one selected from a group consisting of a key, a keyboard, a virtual keyboard and a touch panel.

13. The voice input system according to claim 1, wherein the voice module is one selected from a group consisting of a voice input device, a voice storage device and a combination thereof.

14. The voice input system according to claim 1, wherein the at least one candidate item is at least one selected from a group consisting of a word, a phrase, a sentence and a combination thereof.

15. A voice input method, comprising steps of:
   (A) initiating a speech recognition process by inputting a first input associated with a first parameter of a first speech recognition subject via an inputting device, wherein the first speech recognition subject relates to one selected from a group consisting of a specific number of words, a specific number of syllables, a phrase having a specific number of terms and a combination thereof;

(B) providing a voice and a searching space constructed by a speech recognition model associated with the first speech recognition subject;

(C) obtaining a sub-searching space from the searching space based on the first parameter;

(D) searching at least one candidate item associated with the voice from the sub-searching space; and (E) showing the at least one candidate item.

16. The voice input method according to claim 15 further comprising a step of (F) sifting the at least one candidate item by a second input.

17. The voice input method according to claim 16, wherein the second input is associated with a corresponding parameter of the first speech recognition subject.

18. The voice input method according to claim 16, wherein the second input is associated with a second parameter of a second speech recognition subject.

19. A voice input method for a handset device, comprising steps of:

(A) providing a searching space based on a speech recognition model;

(B) receiving a first input parameter corresponding to a first speech recognition subject associated with the speech recognition model and obtaining a sub-searching space from the searching space based on the first input parameter, wherein the first speech recognition subject relates to one selected from a group consisting of a specific number of words, a specific number of syllables, a phrase having a specific number of terms and a combination thereof;

(C) receiving a voice and recognizing at least one candidate item associated with the voice from the sub-searching space through a speech recognition; and (D) showing the at least one candidate item on the handset device.

20. The voice input method according to claim 19, wherein the speech recognition model comprises a plurality of speech recognition subjects, and the first input parameter is corresponding to the first speech recognition subject.

21. The voice input method according to claim 20 further comprising a step of (E) receiving a second input parameter so as to further sift the at least one candidate item accordingly.

22. A voice input method, having a searching space constructed by a speech recognition model, comprising steps of:

(A) receiving an input parameter corresponding to a first speech recognition subject associated with the speech recognition model and obtaining a sub-searching space from the searching space accordingly, wherein the first speech recognition subject relates to one selected from a group consisting of a specific number of words, a specific number of syllables, a phrase having a specific number of terms and a combination thereof;

(B) receiving a voice and recognizing at least one candidate item associated with the voice from the sub-searching space by a speech recognition; and (C) showing the at least one candidate item by an outputting device.

* * * * *